US012683271B2

(12) United States Patent
Lee

(10) Patent No.: US 12,683,271 B2
(45) Date of Patent: Jul. 14, 2026

(54) IRRADIATION APPARATUS OF ELECTROMAGNETIC WAVES

(71) Applicant: ITC CO., LTD, Daejeon (KR)

(72) Inventor: Keun Deok Lee, Daejeon (KR)

(73) Assignee: ITC CO., LTD, Daejeon (KR)

( * ) Notice: Subject to any disclaimer, the term of this patent is extended or adjusted under 35 U.S.C. 154(b) by 142 days.

(21) Appl. No.: 18/649,235

(22) Filed: Apr. 29, 2024

(65) Prior Publication Data

US 2024/0363998 A1 Oct. 31, 2024

(30) Foreign Application Priority Data

Apr. 28, 2023 (KR) ........................ 10-2023-0056701

(51) Int. Cl.
*H01Q 1/36* (2006.01)
*H01Q 1/02* (2006.01)
*H01Q 11/08* (2006.01)

(52) U.S. Cl.
CPC ................. *H01Q 1/36* (2013.01); *H01Q 1/02* (2013.01); *H01Q 11/083* (2013.01)

(58) Field of Classification Search
CPC .......... H01Q 1/02; H01Q 1/36; H01Q 11/083; A61B 2018/00452; A61B 2018/00023; A61B 2018/00642
See application file for complete search history.

(56) References Cited

U.S. PATENT DOCUMENTS

| | | | | |
|---|---|---|---|---|
| 5,841,407 | A * | 11/1998 | Birnbaum | H01Q 5/385 343/745 |
| 2017/0333637 | A1* | 11/2017 | Merz | A61M 5/31568 |
| 2018/0017512 | A1* | 1/2018 | Akselrod | A61C 5/50 |
| 2018/0180729 | A1* | 6/2018 | Corum | G01S 13/88 |
| 2019/0079157 | A1* | 3/2019 | Yoshii | G01N 24/10 |
| 2021/0089265 | A1* | 3/2021 | van Erven | G06F 3/0443 |
| 2021/0157024 | A1* | 5/2021 | Aponte Luis | G08B 13/24 |

FOREIGN PATENT DOCUMENTS

| | | | | | |
|---|---|---|---|---|---|
| JP | 2004313582 | A | * | 11/2004 | |
| JP | 2015148554 | A | * | 8/2015 | |
| KR | 10-1426539 | B1 | | 8/2014 | |
| KR | 10-2017-0048367 | A | | 5/2017 | |
| KR | 10-2020-0042298 | A | | 4/2020 | |
| KR | 20200042298 | A | * | 4/2020 | A61N 2/008 |

* cited by examiner

*Primary Examiner* — Thai Pham
(74) *Attorney, Agent, or Firm* — Paratus Law Group, PLLC

(57) ABSTRACT

An electromagnetic wave irradiation apparatus includes a housing having a hollow portion formed inside and an open lower side; a coil-type antenna with a spiral shape in the hollow portion and configured to emit electromagnetic waves; a window coupled to the open lower side of the housing; and a capacitance variation measurement unit configured to measure a capacitance variation of the coil-type antenna. The electromagnetic wave irradiation apparatus may further include a cooling unit configured to cool at least one of the window or the housing. The capacitance variation measurement unit includes a capacitance sensor with one side connected to the coil-type antenna and the other side connected to the ground.

10 Claims, 11 Drawing Sheets

IRRADIATION APPARATUS OF ELECTROMAGNETIC WAVES

CROSS-REFERENCE TO PRIOR APPLICATION

This Application claims priority to Korean Patent Application No. 10-2023-0056701 (filed on Apr. 28, 2023), which hereby incorporated by reference in its entirety.

BACKGROUND

The present invention relates to an electromagnetic wave irradiation apparatus equipped with a coil-type antenna. More specifically, the present invention relates to an electromagnetic wave irradiation device that stimulates a part of the user's body with electromagnetic wave energy emitted through a coil-type antenna to facilitate treatment, includes a cooling unit to prevent overheating of the apparatus, and measures the amount of energy transfer to determine whether contact is made with the user, thereby enabling efficient treatment.

Electromagnetic waves are waves that are generated while an electric field and a magnetic field are varied over time, and examples of the electromagnetic waves include gamma rays, X-rays, ultraviolet rays, visible light, infrared rays, microwaves, radio waves, etc.

Since these electromagnetic waves stimulate the molecular motion of polar substances as they pass through them, thus generating heat, they are irradiated onto the user's body and used to examine and diagnose bones and skeletal structures or to treat body parts such as the back, shoulders, knees, neck, and the like.

Furthermore, they are also used as an auxiliary means for cancer treatment. Electromagnetic waves, which generate heat through the process of dielectric heating, cause the water molecules exposed to the electromagnetic waves to repeatedly undergo molecular rotation a number of times proportional to a frequency of electromagnetic waves due to dipole moments of water molecules, which make up most of the human body, whereby the molecules are pushed or pulled to each other or collide with each other, resulting in the generation of heat in the tissues exposed to the electromagnetic waves.

This generated heat can be used for various procedures. For example, adipocytes can be removed or cells from a specific area can be removed. Additionally, they can serve as an auxiliary means for treating cancer in conjunction with chemotherapy or radiation therapy.

Meanwhile, traditional electromagnetic wave irradiation devices generate heat during the irradiation process and include separate cooling devices to dissipate this heat.

These additional cooling devices may reduce the functionality of the product or complicate its structure. Additionally, due to interference from electromagnetic waves, it is very difficult to determine the extent of magnetic field and heat source exposure to the user.

Related Art

KR 10-2017-0048367 A

SUMMARY

The present invention was devised to solve the aforementioned problems and aims to provide an electromagnetic wave irradiation apparatus that can stimulate the area below the skin by stimulating a part of the user's body using electromagnetic wave energy emitted through a coil-type antenna.

In addition, the present invention aims to provide an electromagnetic wave irradiation apparatus that can prevent heat generation and measure the amount of energy transfer.

An electromagnetic wave irradiation apparatus according to an embodiment of the present invention may include a housing 10 having a hollow portion formed inside and an open lower side; a coil-type antenna 20 with a spiral shape in the hollow portion and configured to emit electromagnetic waves; and a capacitance variation measurement unit 70 configured to measure a capacitance variation of the coil-type antenna 20.

Additionally, the coil-type antenna 20 may have a horn shape, with one side connected to the housing 10 and a radius of a bottom surface gradually widening towards the other side.

Additionally, an inclination angle with respect to the bottom surface of the coil-type antenna 20 may decrease from one side to the other side.

In addition, the coil-type antenna 20 may be connected to the housing 10 on one side and extend downward on the other side to form a spiral-shaped curve on a plane.

Additionally, at least a portion of the coil-type antenna 20 may be arranged on the same plane.

Additionally, the bottom surface of the housing 10 may be one of circular, oval, rectangular, or square shapes.

Moreover, the coil-type antenna 20 is preferably shaped to match the shape of the bottom surface of the housing 10.

In addition, the electromagnetic wave irradiation apparatus may further include a window 30 coupled to the open lower side of the housing 10.

Additionally, the electromagnetic wave irradiation apparatus may further include a cooling unit configured to cool at least one of the window 30 or the housing 10.

In addition, the cooling unit may include a Peltier element 61 with one side in contact with an upper side of the housing 10.

In addition, the cooling unit may further include a heat exchange unit 65 in contact with the other side of the Peltier element 61; a pump 64 connected to the heat exchange unit 65 to control a coolant flowing through the heat exchange unit 65; and a heat dissipation unit 60 connected to the pump 64 to dissipate heat from the coolant.

Moreover, the capacitance variation measurement unit 70 may include a capacitance sensor 71 with one side connected to the coil-type antenna 20 and the other side connected to the ground.

In addition, it is preferable that the ground connected to the capacitance sensor 71 is different from the ground of a radio frequency (RF) oscillator 72 configured to supply power to the coil-type antenna 20.

Additionally, either of the ground of the capacitance sensor 71 or the ground of the RF oscillator 72 may be connected to the housing 10.

The present invention can deliver energy to the user's deep tissue by stimulating the subcutaneous tissue of the user's body with electromagnetic wave energy emitted through the coil-type antenna.

In addition, a cooling unit is provided to prevent overheating due to the delivery of electromagnetic wave energy.

Furthermore, the present invention can measure the amount of energy transfer to determine whether contact is made with the user and may estimate the temperature of the deep tissue (user's adipocytes) to allow power interruption when the temperature is high, thereby ensuring safe treatment.

DETAILED DESCRIPTION

Figure 1:
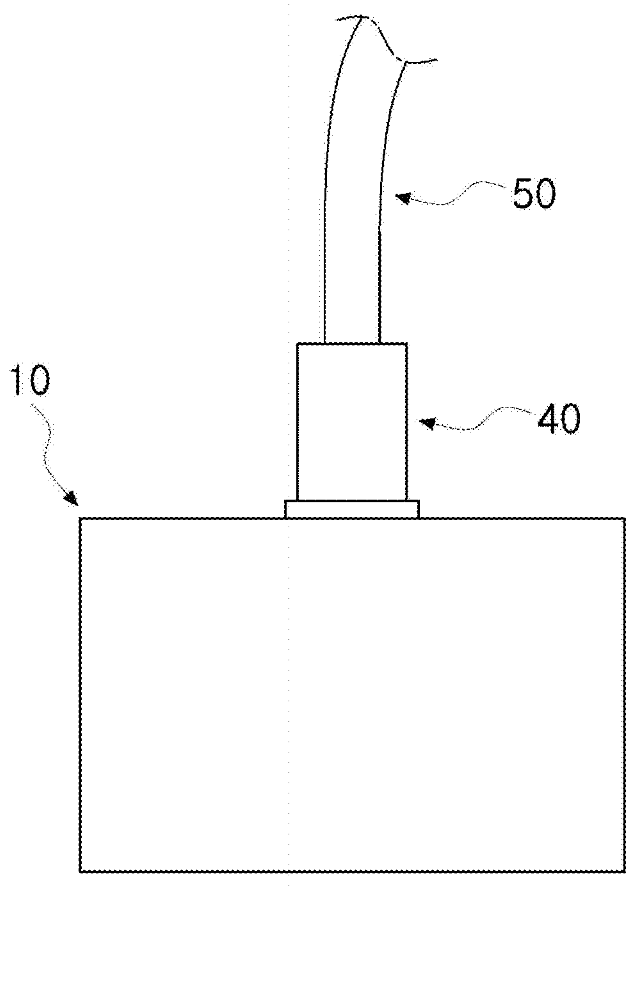
FIG. 1 is a side view of an electromagnetic wave irradiation apparatus according to the present invention.

Hereinafter, the present invention will be described in more detail with reference to the drawings.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. The term "and/or" includes any and all combinations of one or more of the associated listed items. The term "or" can be interpreted as a logical "exclusive or" in context, but generally, unless the context explicitly states "otherwise" or "exclusive OR," it should be interpreted as having the same meaning as "and/or", that is, a logical inclusive "or".

It will be understood that when an element is "connected to" or "coupled with/to" to another element, the element may be directly connected or coupled to another element, and there may be an intervening element between the element and another element. On the other hand, it will be understood that when an element is "directly connected" or "directly coupled" to another element, there is no intervening element between the element and another element. In addition, when a first element is connected to or accesses a second element on the network, it means that data can be exchanged between the first and second elements via wired or wireless communication.

Moreover, the suffixes "module" and "unit" used for referring to elements in the following description are provided solely for ease of writing this specification and do not impart any special significance or role by themselves. Therefore, "module" and "unit" may be used interchangeably.

When these elements are implemented in actual applications, two or more elements may be combined into a single element as needed, or one element may be subdivided into two or more elements. Throughout the drawings, identical or similar elements are assigned the same reference numerals, and detailed descriptions of elements with the same reference numerals may be omitted by substituting the previous explanations.

Additionally, the present invention encompasses all possible combinations of the embodiments described in this specification. Various embodiments of the present invention are distinct but not mutually exclusive. Specific shapes, structures, functions, and characteristics described herein in one embodiment can be implemented in other embodiments. For example, the elements mentioned in the first and second embodiments can perform all the functions of both the first and second embodiments.

An electromagnetic wave irradiation apparatus according to the present invention relates to an electromagnetic wave irradiation device that stimulates a part of the user's body with electromagnetic wave energy emitted through a coil-type antenna to facilitate treatment, includes a heat dissipation unit 60 to prevent overheating of the apparatus, and measures whether contact is made with the user and the elapsed treatment time through a capacitance variation measurement unit 70, thereby ensuring efficient treatment using electromagnetic waves.

Hereinafter, the electromagnetic wave irradiation apparatus according to the present invention will be described in detail with reference to the attached drawings.

Figure 2:
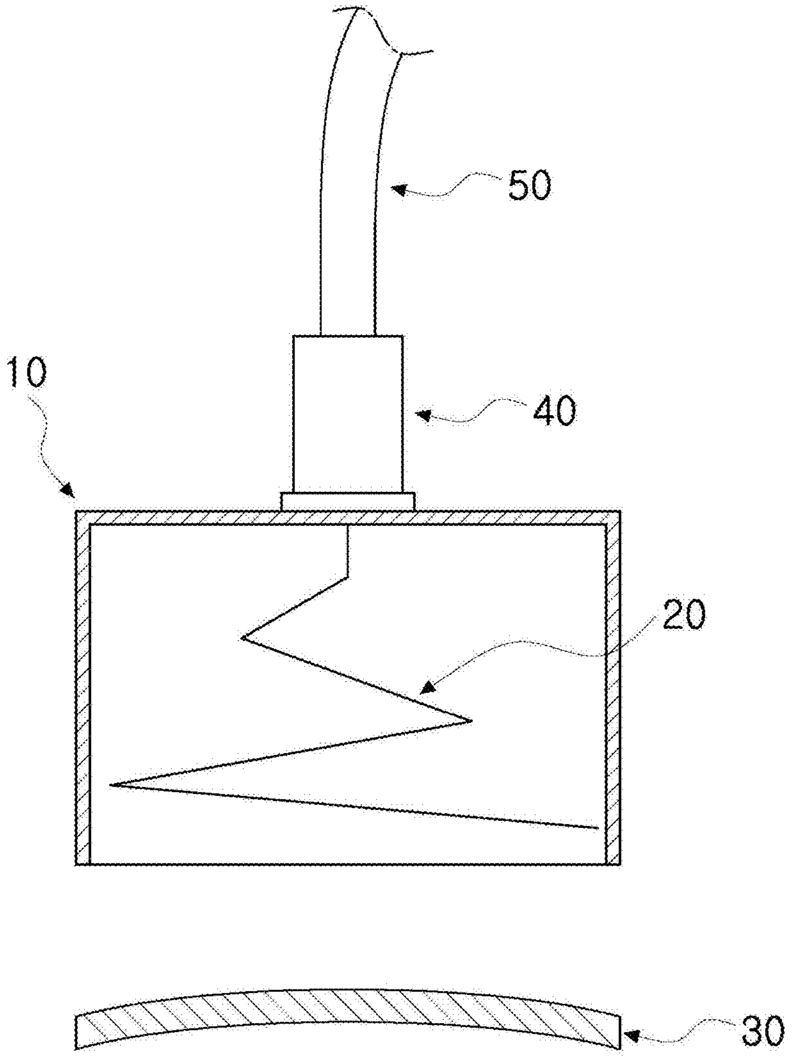
FIG. 2 is a side cross-sectional view of the electromagnetic wave irradiation apparatus according to the present invention.
Figure 3:
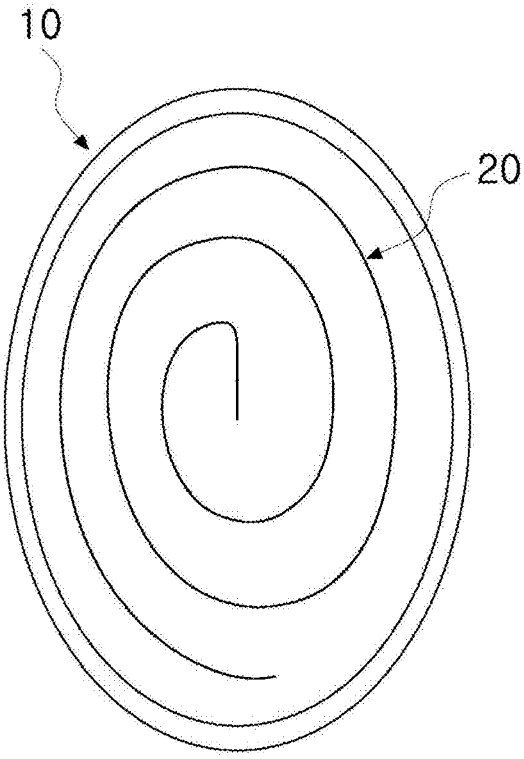
FIG. 3 is a bottom view illustrating an example of the bottom surface of a housing being oval in the electromagnetic wave irradiation apparatus according to the present invention.
Figure 4:
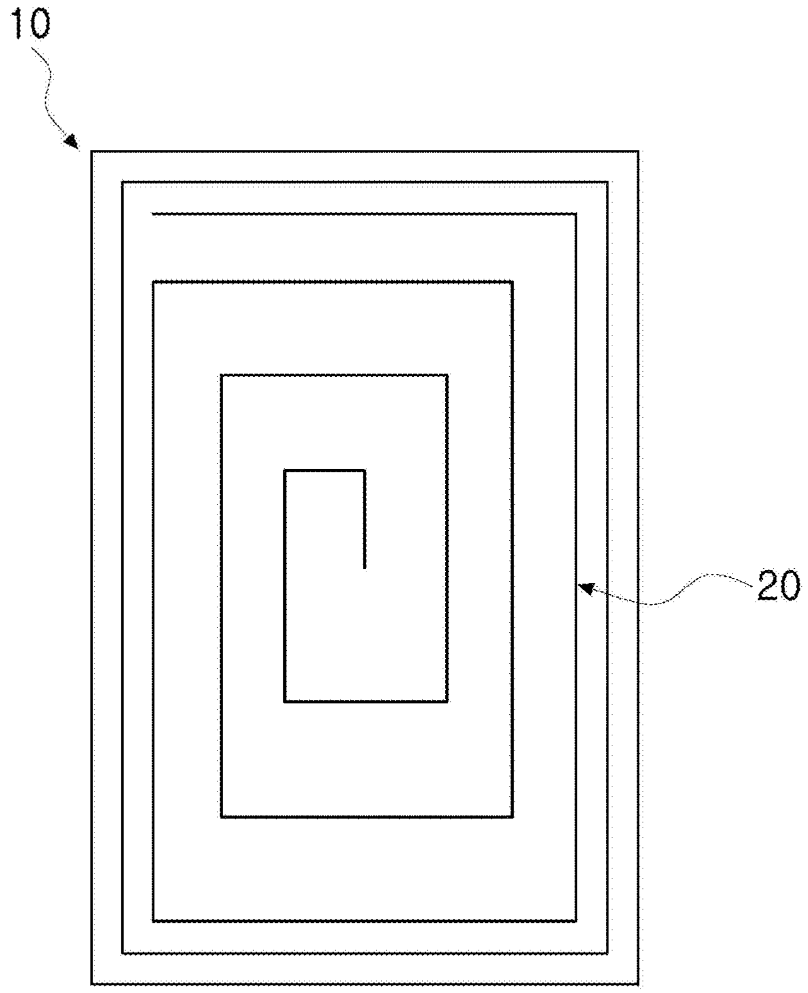
FIG. 4 is a bottom view illustrating an example of the bottom surface of a housing being rectangular in the electromagnetic wave irradiation apparatus according to the present invention.
Figure 5:
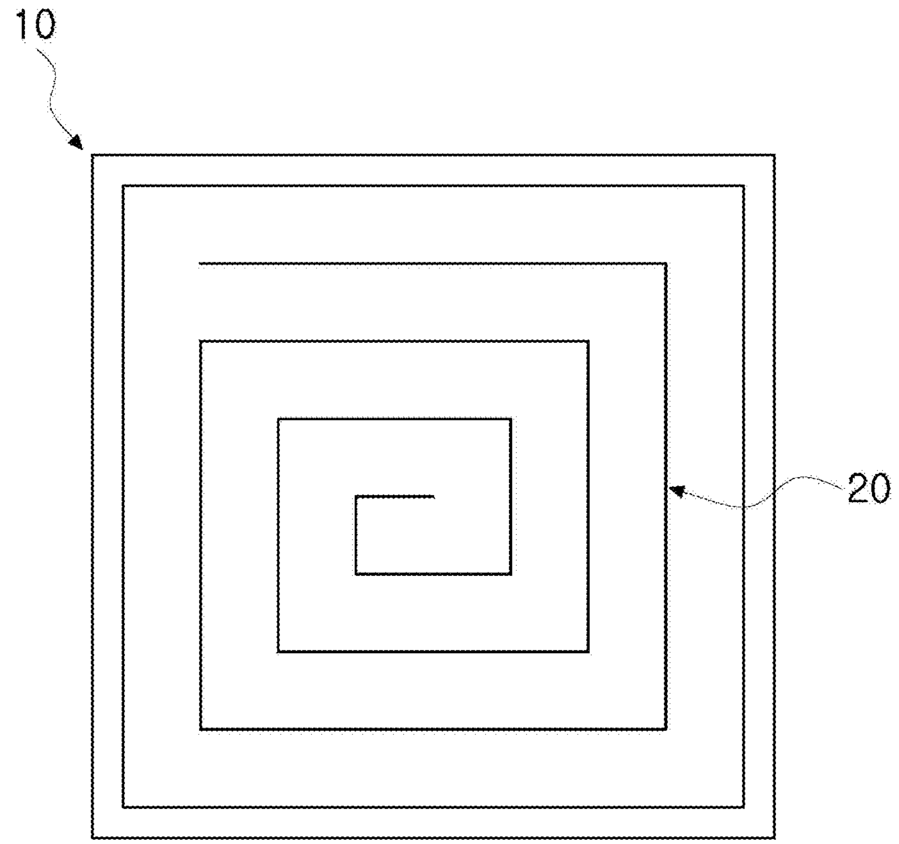
FIG. 5 is a bottom view illustrating an example of the bottom surface of the housing being square in the electromagnetic wave irradiation apparatus according to the present invention.
Figure 6:
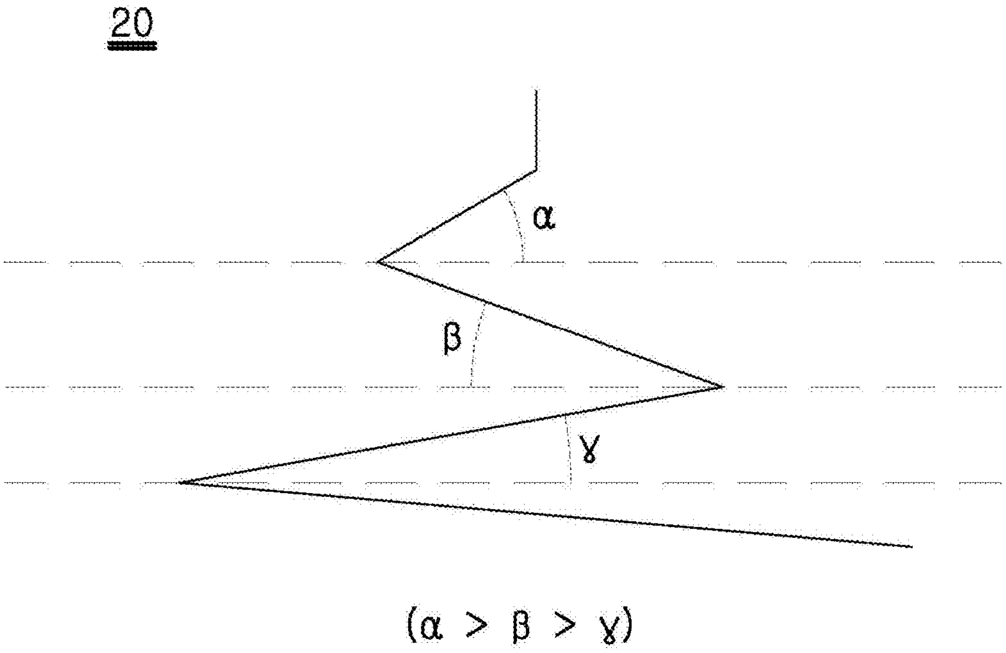
FIG. 6 is a side view of a coil-type antenna in the electromagnetic wave irradiation apparatus according to the present invention.
Figure 7:
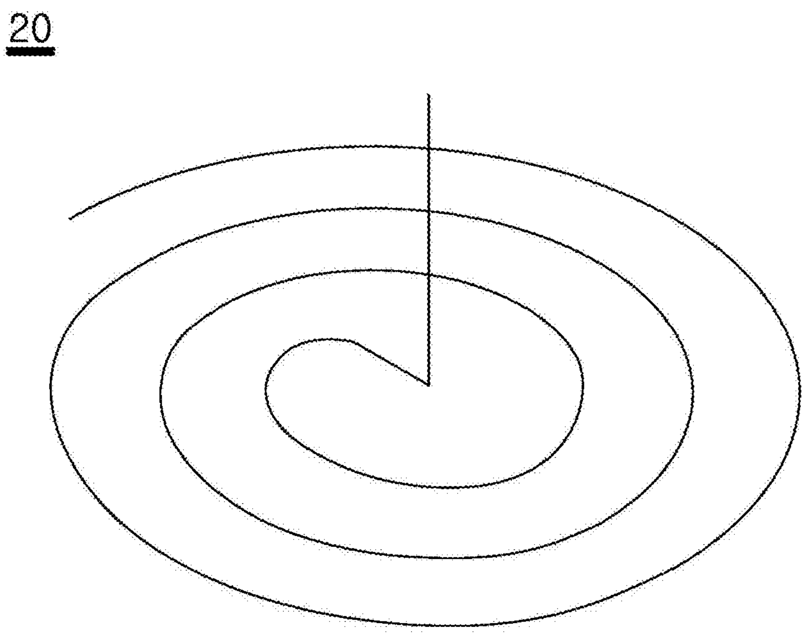
FIG. 7 is a perspective view illustrating another embodiment of the coil-type antenna in the electromagnetic wave irradiation apparatus according to the present invention.
Figure 8:
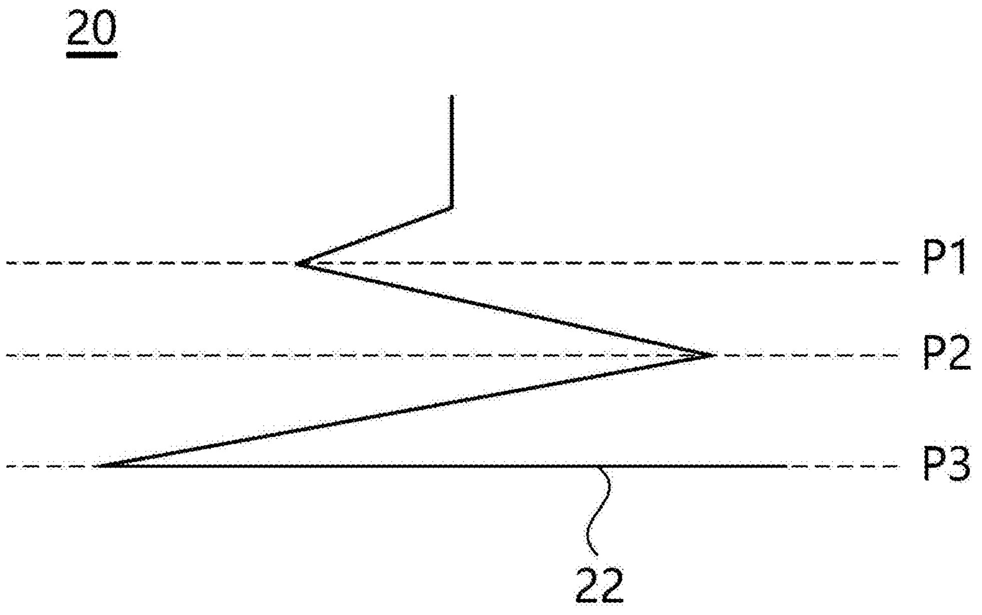
FIG. 8 is a side view illustrating another embodiment of the coil-type antenna in the electromagnetic wave irradiation apparatus according to the present invention.
Figure 9:
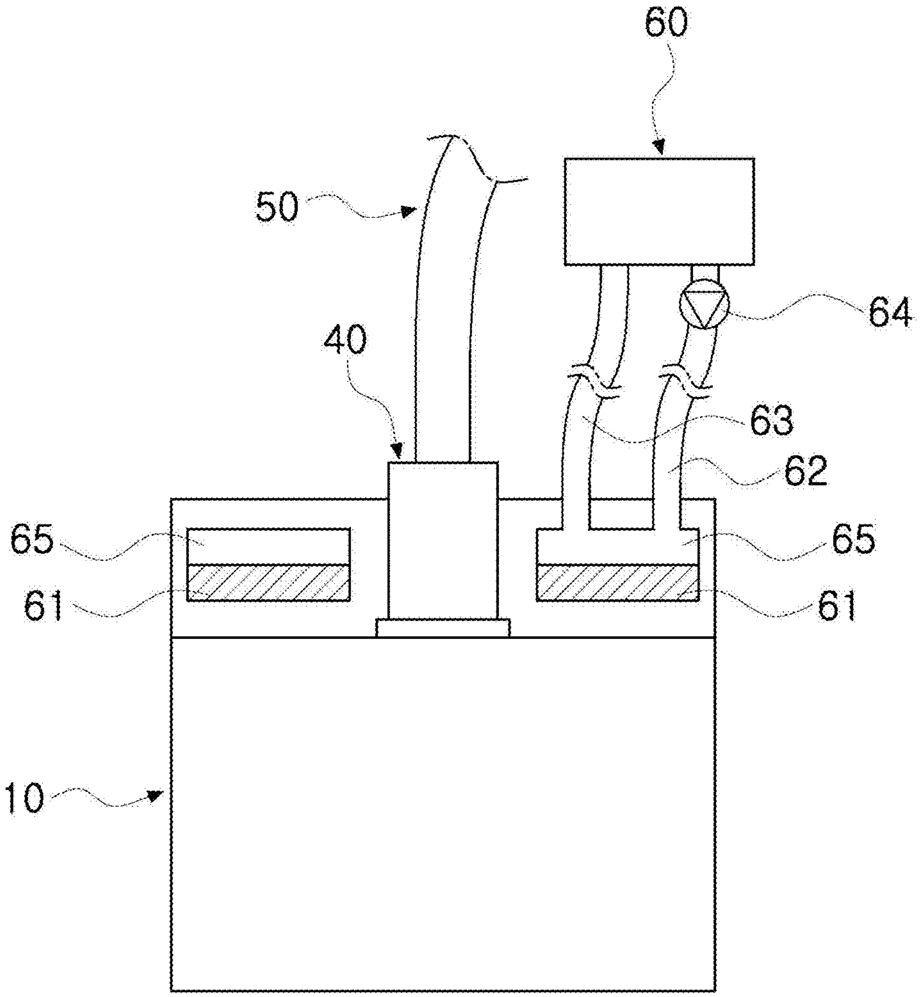
FIG. 9 is a conceptual diagram illustrating an example in which a cooling unit is provided in the electromagnetic wave irradiation apparatus according to the present invention.

FIG. 1 is a side view of an electromagnetic wave irradiation apparatus according to the present invention; FIG. 2 is a side cross-sectional view of the electromagnetic wave irradiation apparatus according to the present invention; FIG. 3 is a bottom view illustrating an example of the bottom surface of a housing being oval in the electromagnetic wave irradiation apparatus according to the present invention; FIG. 4 is a bottom view illustrating an example of the bottom surface of a housing being rectangular in the electromagnetic wave irradiation apparatus according to the present invention; and FIG. 5 is a bottom view illustrating an example of the bottom surface of the housing being square in the electromagnetic wave irradiation apparatus according to the present invention. FIG. 6 is a side view of a coil-type antenna in the electromagnetic wave irradiation apparatus according to the present invention. FIG. 7 is a perspective view illustrating another embodiment of the coil-type antenna in the electromagnetic wave irradiation apparatus according to the present invention. FIG. 8 is a side view illustrating another embodiment of the coil-type antenna in the electromagnetic wave irradiation apparatus according to the present invention. FIG. 9 is a conceptual diagram illustrating an example in which a cooling unit is provided in the electromagnetic wave irradiation apparatus according to the present invention.

The electromagnetic wave irradiation apparatus provides treatment by emitting electromagnetic waves to the user's body through the coil-type antenna 20, and may include a housing 10, a coil-type antenna 20, and a capacitance variation measurement unit 70. The electromagnetic wave irradiation apparatus may further include at least one of a window 30, a radio frequency (RF) oscillator 72, or a heat dissipation unit 60.

The housing 10 may emit electromagnetic waves to the user's body through the coil-type antenna 20 provided therein when in proximity or contact with the body.

Referring to FIGS. 1 and 2, the housing 10 may have an empty hollow portion inside where the coil-type antenna 20 is disposed. The housing 10 may have an opening on the lower side.

The housing 10 may be made of a material with high thermal conductivity. The housing 10 may be made of a metal material, which can be any one of silver, copper, gold, aluminum, tungsten, zinc, nickel, iron, lead, platinum, and mercury, or a combination of these materials.

The housing 10 may have a cylindrical shape with a circular cross-section or a horn shape that gradually widens from the top to the bottom to match the conical shape of the coil-type antenna 20 described below.

The housing 10 may have various cross-sections, such as oval, rectangular, or square cross-sections.

Referring to FIGS. 3 to 5, the housing 10 may have a bottom surface that is oval, rectangular, or square. Corresponding to the housing 10 having an oval, rectangular, or square bottom surface, the bottom surface of the coil-type antenna 20 may be oval, rectangular, or square, respectively.

The coil-type antenna 20 corresponding to the bottom surface of the housing 10 may emit high-density electromagnetic waves in the direction of the lower opening of the housing 10.

Meanwhile, although the specification illustrates and describes examples where the bottom surface of the housing 10 is circular, oval, rectangular, or square, it may also be formed in various shapes with multiple angles, such as triangles or pentagons.

It is preferable for the coil-type antenna 20 to be made of a material that can easily be reshaped. This is because the coil-type antenna 20 can be easily adjusted in length and shape according to the bottom shape of the housing 10. This allows the coil-type antenna 20 to adapt readily to various forms of the housing 10.

Referring to FIGS. 2 and 6, the coil-type antenna 20 may be disposed in the inner space, that is, hollow portion, formed within the housing 10. The coil-type antenna 20 may have a spiral shape.

The coil-type antenna 20 may be connected to the RF oscillator 72 through a connection part 40 and an RF cable 50 provided on the upper side of the housing 10 and may emit electromagnetic waves. The coil-type antenna 20 may be connected to one end of the RF oscillator 72. The other end of the RF oscillator 72 may be connected to the ground or the housing 10.

It is preferable for the coil-type antenna 20 to be an integral multiple, half, or quarter of the electromagnetic wave wavelength.

The coil-type antenna 20 may be formed in a spiral shape, and may have a horn shape having a radius increasing gradually from the top to the bottom, starting from the point connected to the connection part 40.

The coil-type antenna 20 may have an increasing radius and a decreasing inclination angle from the top to the bottom.

The coil-type antenna 20 may be formed in a spiral shape. The coil-type antenna 20 may be formed in a horn shape having a radius widening gradually from the top to the bottom. In this case, the radius of the coil-type antenna 20 may gradually increase toward the lower side. As shown in FIG. 6, when viewed from the side of the coil-type antenna 20, the coil-type antenna 20 may be formed such that the inclination angle '$\alpha$' formed on the upper side, the inclination angle '$\beta$' formed in the middle, and the inclination angle '$\gamma$' formed on the lower side gradually decrease from the top to the bottom. The coil-type antenna 20 is formed such that the inclination angle decreases even as the radius widens downward, so it may maintain a compact form.

This helical shaped coil-type antenna 20 may focus and emit electromagnetic waves, resulting in high energy transfer efficiency.

Referring to FIG. 7, the coil-type antenna 20 may be connected to the connection part 40, and may be spaced downward to form a spiral curve on a plane. Specifically, a portion may be elongated vertically and connected to the connection part 40, while the remaining portion may be formed in a spiral shape on a plane.

Referring to FIG. 8, the coil-type antenna 20 may be connected to the connection part 40, wherein at least a portion 22 of the coil-type antenna 20 is arranged on the same plane. Planes P1, P2, and P3 represent planes parallel to one another. The portion 22 of the antenna arranged on the same plane may be on any plane, but is preferably arranged on the plane opposite the connection part 40.

The window 30 may be coupled to the open lower side of the housing 10. Electromagnetic waves emitted from the coil-type antenna 20 may be irradiated outside through the window 30.

The window 30 can be made of a material with high thermal conductivity, preferably ceramic.

Referring to FIG. 2, the window 30 may be formed in the shape of a plate with the upper side of the middle part being convex upward.

The connection part 40 may function as a connector to connect to the RF cable 50 and may be positioned on the upper side of the housing 10. The connection part 40 may connect the coil-type antenna 20 provided inside the housing 10 to the RF cable 50, allowing the coil-type antenna 20 to receive power and emit electromagnetic waves.

One end of the RF cable 50 may be coupled to the connection part 40 provided on the upper side of the housing 10 and connected to the coil-type antenna 20 provided inside the housing 10. The other end of the RF cable 50 establishes an electrical/mechanical connection with another connector or an adapter, allowing the coil-type antenna 20 to emit electromagnetic waves. The RF cable 50 substantially connects the RF oscillator 72 and the coil-type antenna 20.

The electromagnetic wave irradiation apparatus may further include a control unit (not shown) for RF control. The electromagnetic wave irradiation apparatus may further include a display (not shown) for information display and an operating unit (not shown) such as buttons or a touch display for control.

Based on user operation or a searched program, the electromagnetic wave irradiation apparatus may emit any one frequency of 2 to 5 GHz or a specific band frequency. By adjusting the frequency change or current change of the RF oscillator 72, the electromagnetic wave irradiation apparatus may change the frequency or power of the emitted electromagnetic waves.

The control unit may automatically cut off power if the temperature measured by the capacitance variation measurement unit 70 rises above a predetermined threshold or if the amount of transferred energy exceeds a threshold.

Referring to FIG. 9, the cooling unit may include a heat exchange unit 65, a heat dissipation unit 60, a Peltier element 61, an inlet pipe 62, an outlet pipe 63, and a pump 64.

The Peltier element 61 is an electronic material that utilizes the Peltier effect (thermoelectric effect). One lateral side of the Peltier element 61 may be connected to the housing 10 to lower the temperature of the housing 10, and the heat exchange unit 65 may be attached to the other lateral side of the Peltier element 61 to dissipate the heat from the Peltier element 61.

The Peltier element 61 may be disposed on the upper part of the housing 10. The Peltier element 61 may lower the high temperature generated in the housing 10 and/or window 30 due to the emission of electromagnetic waves through its cooling effect.

Heat generated from the subject's skin may be transferred to the window 30, and the heat from the window 30 may be transferred to the housing 10. The Peltier element 61 may lower the heat originating from the subject through its cooling effect. The heat generated from the subject's skin is presumed to be caused by the impedance difference at the interface between the air and the skin due to the emitted electromagnetic waves or by heat generated and transferred from the deeper tissues.

The heat exchange unit 65 may be connected to the heat dissipation unit 60 through the outlet pipe 63 and the inlet pipe 62.

Regarding the operation process of the heat dissipation unit 60, a coolant may be forced to circulate by the operation of the pump 64. It flows into one side of the Peltier element 61 through the inlet pipe 62, then is discharged through the outlet pipe 63 and transferred back to the heat dissipation unit 60. In this process, the coolant circulates and forcibly discharges the heat emitted by the Peltier element 61.

The heat dissipation unit 60 may be equipped with an air-cooled heat sink. The heat dissipation unit 60 may be equipped with a heat exchanger of an air conditioner or a similar configuration.

During the electromagnetic wave procedure, it is necessary to check the extent of electromagnetic wave exposure to the subject. This is to ensure a specified amount of energy to be delivered to the subject and to prevent the subject's deep tissue (under the skin) temperature from becoming excessively high by estimating the temperature at the subject's deep tissue.

For this purpose, it is desirable for the electromagnetic wave irradiation apparatus to ascertain the degree of contact with the subject. The electromagnetic wave irradiation apparatus may determine the contact status, contact duration, and contact intensity based on the degree of contact. Through this, the electromagnetic wave irradiation apparatus may estimate the amount of energy transfer and the deep tissue temperature.

To determine the degree of contact, in one embodiment, the electromagnetic wave irradiation apparatus may be equipped with a pressure sensor. The pressure sensor (not shown), such as a load cell, may be provided on the lower side of the housing 10. When the housing 10 (or window 30) is brought into contact with the subject, the pressure sensor may measure the contact status (contact duration) and contact intensity.

The variation measurement unit 70 may be included in the electromagnetic wave irradiation apparatus to determine the degree of contact.

Figure 10:
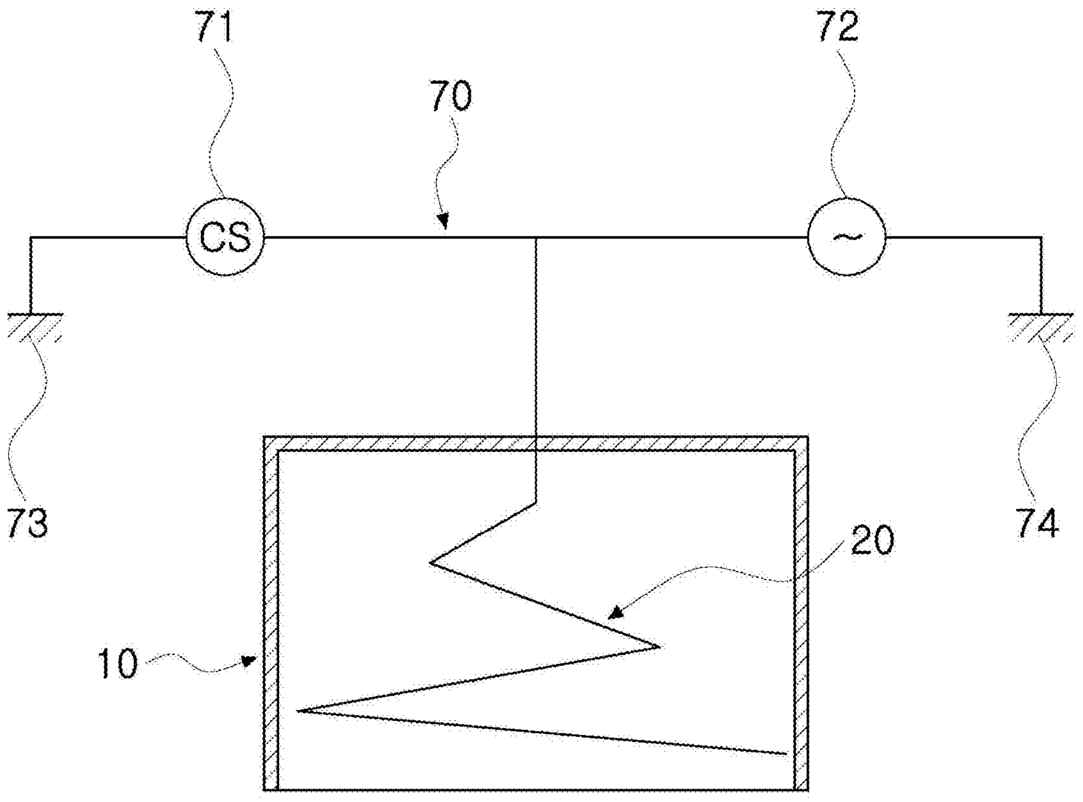
FIG. 10 is a conceptual diagram illustrating an embodiment of a capacitance variation measurement unit in the electromagnetic wave irradiation apparatus according to the present invention.
Figure 11:
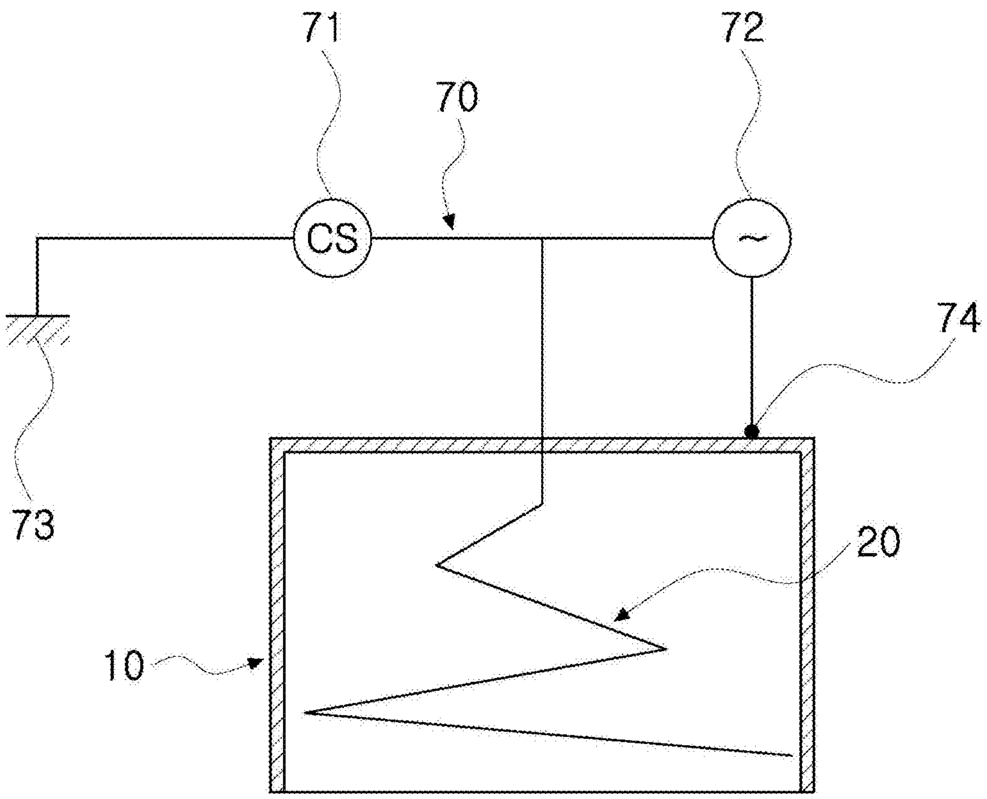
FIG. 11 is a conceptual diagram illustrating another embodiment of the capacitance variation measurement unit in the electromagnetic wave irradiation device according to the present invention.

FIG. 10 is a conceptual diagram illustrating an embodiment of a capacitance variation measurement unit in the electromagnetic wave irradiation apparatus according to the present invention; FIG. 11 is a conceptual diagram illustrating another embodiment of the capacitance variation measurement unit in the electromagnetic wave irradiation device according to the present invention; and FIG. 12 is a conceptual diagram illustrating another embodiment of the capacitance variation measurement unit in the electromagnetic wave irradiation device according to the present invention.

Figure 12:
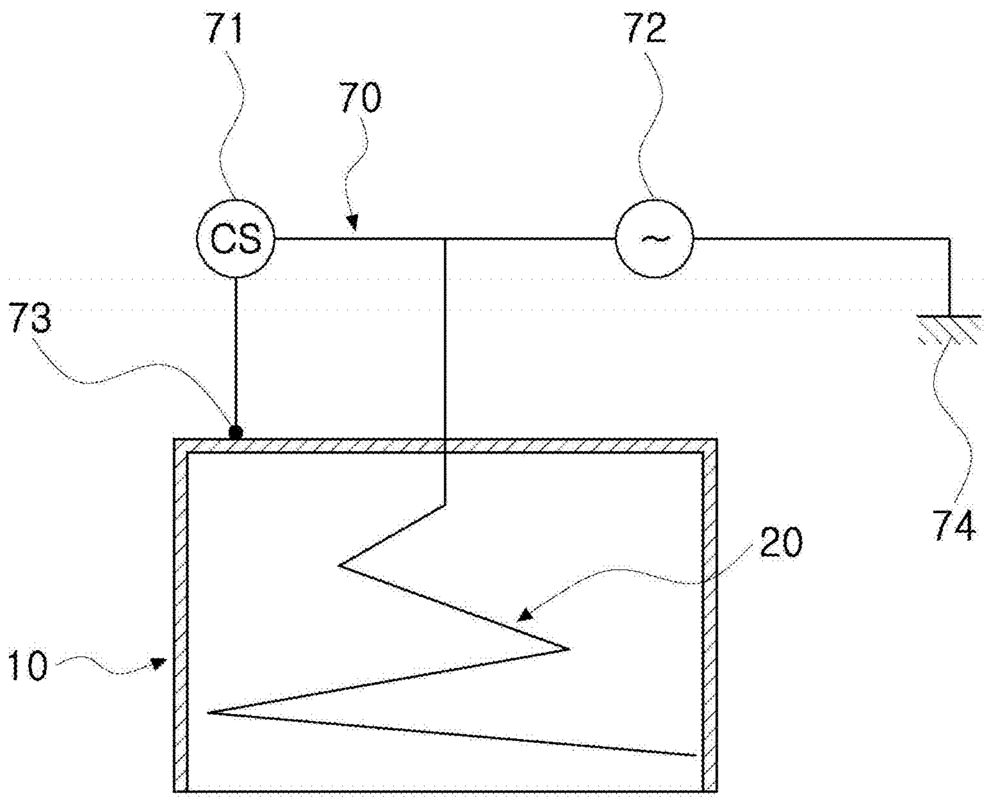
FIG. 12 is a conceptual diagram illustrating another embodiment of the capacitance variation measurement unit in the electromagnetic wave irradiation device according to the present invention.

Referring to FIGS. 10 to 12, the capacitance variation measurement unit 70 may include a capacitance sensor 71. The capacitance sensor 71 may measure the capacitance variation in a non-contact manner. A pressure sensor can take measurements only when it comes into direct contact with the user's body. However, the capacitance sensor 71 may detect the proximity of the housing 10, that is, the window 30, without direct contact with the subject. In other words, even if the apparatus does not make direct contact with the subject, the control unit may estimate the amount of energy transfer in a proximity state through the capacitance variation measurement unit 70. The capacitance sensor 71 may measure changes in the capacitance of the coil-type antenna 20. Through this, it is possible to determine how close the coil-type antenna 20 is to the subject.

Referring to FIG. 10, the capacitance sensor 71 may be connected to the coil-type antenna 20 on one side and to the ground on the other side. The ground 73 connected to the capacitance sensor 71 must not be common with the ground 74 connected to the RF oscillator 72 so that the accurate capacitance variation can be measured. In other words, the capacitance sensor 71 may be connected in parallel with the RF oscillator 72 but to a ground different from that of the RF oscillator.

In FIG. 10, the ground 73 of the capacitance sensor 71 and the ground 74 of the RF oscillator 72 are shown as not being connected to the housing 10, but the present invention is not limited thereto. For example, either of the ground 73 of the capacitance sensor 71 or the ground 74 of the RF oscillator 72 may be connected to the housing 10. FIG. 11 shows that the ground 74 of the RF oscillator 72 and the housing 10 are connected, and FIG. 12 shows that the ground 73 of the capacitance sensor 71 and the housing 10 are connected.

The electromagnetic wave irradiation apparatus may further include a temperature sensor. The temperature sensor may measure the skin temperature of the subject or the deep tissue temperature of the subject. The temperature sensor may assist in estimating the temperature by the capacitance variation measurement unit 70 or operate independently of the capacitance variation measurement unit 70.

The electromagnetic wave irradiation apparatus according to the present invention stimulates a part of the user's body and may stimulate the deep subcutaneous tissue (deep tissue) through the electromagnetic wave energy emitted by the coil-type antenna 20.

In addition, the cooling unit equipped with the Peltier element 61 and the heat dissipation unit 60 may prevent burns on the user's skin caused by the emission of electromagnetic wave energy.

Moreover, by measuring the amount of energy transfer to determine whether contact is made with the user and estimating the temperature of deep tissue (user's adipocytes), power can be cut off when the temperature is high, thereby ensuring safe and efficient procedures (treatment).

The present invention may be implemented in hardware or software. With regard to the implementation, the present invention may also be implemented as a computer-readable code in a computer-readable recording medium. That is, the present invention may be embodied in the form of a recording medium including instructions executable by a computer. The computer-readable recording medium includes all types of recording medium for storing data that may be read by a computer system. Examples of the computer-readable recording medium may include computer storage media and communication storage media. The computer storage media include any storage medium that is implemented by a certain method or technology for storing information such as computer-readable instructions, data structures, program modules, or other data, without limitation to volatile/non-volatile/hybrid memory or removable/non-removable media. The communication storage media include a modulated data signal such as a carrier wave or other transmission mechanisms, and any information delivery media. Also, functional programs, codes, and code segments for implementing the present invention can be easily construed by programmers skilled in the art to which the present invention pertains.

In addition, although the exemplary embodiments of the present invention have been illustrated and described, the present invention is not limited to the specific embodiments described above. It is obvious to those skilled in the art that various modifications and changes can be made thereto without departing from the scope of the present invention as claimed in the claims and such modifications and changes should not be understood individually from the technical spirit or prospect of the present invention.

DESCRIPTION OF REFERENCE NUMERALS

| | |
|---|---|
| 10: | HOUSING |
| 20: | COIL-TYPE ANTENNA |
| 30: | WINDOW |
| 40: | CONNECTION PART |
| 60: | HEAT DISSIPATION UNIT |
| 65: | HEAT EXCHANGE UNIT |

The invention claimed is:

1. An electromagnetic wave irradiation apparatus comprising:

a housing having a hollow portion formed inside and an open lower side;

a coil-type antenna with a spiral shape in the hollow portion and configured to emit electromagnetic waves; and a capacitance variation measurement unit configured to measure a capacitance variation of the coil-type antenna, wherein the capacitance variation measurement unit comprises a capacitance sensor with one side connected to the coil-type antenna and an other side connected to a ground, and wherein the ground connected to the capacitance sensor is different from a ground of a radio frequency (RF) oscillator configured to supply power to the coil-type antenna.

2. The electromagnetic wave irradiation apparatus of claim 1, wherein the coil-type antenna has a horn shape, with one side connected to the housing and a radius of a bottom surface gradually widening towards an other side.

3. The electromagnetic wave irradiation apparatus of claim 2, wherein an inclination angle with respect to the bottom surface of the coil-type antenna decreases from one side to an other side.

4. The electromagnetic wave irradiation apparatus of claim 1, wherein the coil-type antenna is connected to the housing on one side and extends downward on an other side to form a spiral-shaped curve on a plane.

5. The electromagnetic wave irradiation apparatus of claim 1, wherein at least a portion of the coil-type antenna is arranged on a same plane.

6. The electromagnetic wave irradiation apparatus of claim 1, wherein a shape of a bottom surface of the housing is one of circular, oval, rectangular, or square shapes and the coil-type antenna is shaped to match the shape of the bottom surface of the housing.

7. The electromagnetic wave irradiation apparatus of claim 1, further comprising:

a window coupled to the open lower side of the housing; and a cooling unit configured to cool at least one of the window or the housing.

8. The electromagnetic wave irradiation apparatus of claim 7, wherein the cooling unit comprises a Peltier element with one side in contact with an upper side of the housing.

9. The electromagnetic wave irradiation apparatus of claim 8, wherein the cooling unit comprises a heat exchange unit in contact with an other side of the Peltier element;

a pump connected to the heat exchange unit to control a coolant flowing through the heat exchange unit; and a heat dissipation unit connected to the pump to discharge heat from the coolant.

10. The electromagnetic wave irradiation apparatus of claim 1, wherein either of the ground of the capacitance sensor or the ground of the RF oscillator is connected to the housing.

* * * * *